UNITED STATES PATENT OFFICE.

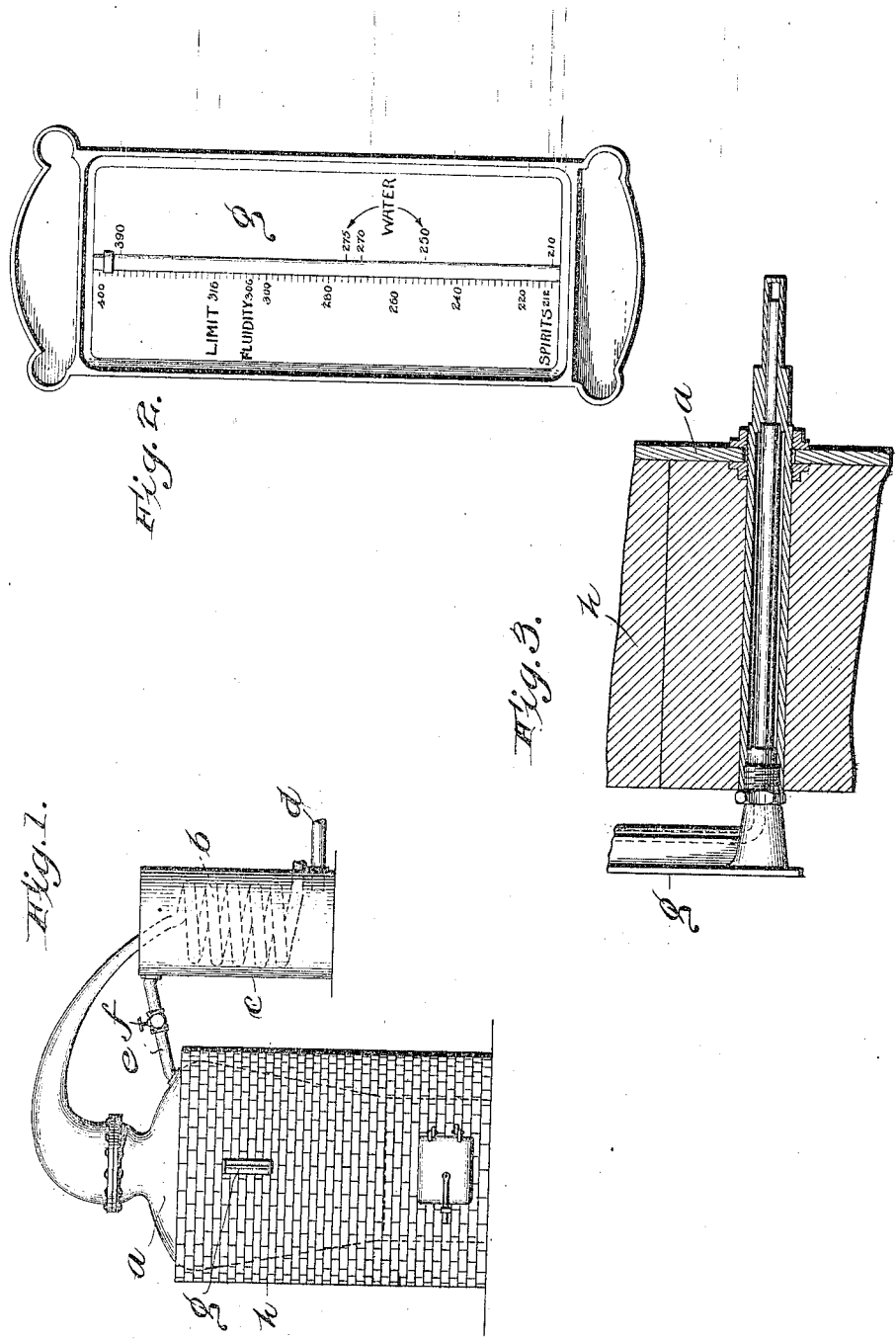

STEPHENS NEAL, OF CORDELE, GEORGIA, ASSIGNOR TO THE NEAL NAVAL STORES COMPANY, OF CORDELE, GEORGIA, A CORPORATION OF GEORGIA.

DISTILLATION PROCESS.

1,036,306.

Specification of Letters Patent. Patented Aug. 20, 1912.

Application filed April 17, 1909. Serial No. 490,612.

*To all whom it may concern:*

Be it known that I, STEPHENS NEAL, a citizen of the United States, residing at Cordele, in the county of Crisp and State of Georgia, have invented certain new and useful Improvements in Distillation Processes; and I do hereby declare the following to be a full, clear, and exact description of the invention, such as will enable others skilled in the art to which it appertains to make and use the same.

My invention relates to improvements in distillation processes and is especially intended for use in the production of turpentine and rosin.

It is well understood in turpentine distillation that to obtain a good quality of rosin it is necessary that the crude gum should not become charred or carbonized during the distillation process. It is further well known that while distilling crude, raw material the uncombined water and lighter oils first come over very readily when a temperature of about 212° F. is reached. When the temperature, however, is raised less volatile oils come off until a temperature of say about 265° F. is reached when I add water and the distillation is continued. It is further well known that if the temperature is allowed to rise too high, the rosin will become charred and an inferior product will be produced. The process of distilling turpentine, however, for commercial reasons, is carried on with very cheap labor, and these operatives generally determine when to stop the distillation process by listening to the worm to ascertain whether or not ebullition in the still has ceased. This method, however, as will be apparent, is very crude and the result is not only an uneconomical production of spirits, but very often an inferior quality of rosin. As a matter of fact, even were the workmen better skilled, it would be impossible for them to tell from the sounds inside the still whether or not a charring had taken place or was about to take place in the rosin to be produced. All that can be determined by the present custom of listening to the worm, is whether or not the product is slowly boiling or is vigorously boiling. The still does not emit sounds indicating temperatures. It merely emits sounds showing whether or not water is present inside the still. It should also be noted that the production of low grades of rosin is due simply to the undue heating in the still, for the higher the still is heated the more colophonic acid is formed which turns the rosin to a darker hue.

I have discovered certain critical points beyond which the temperature must not rise in order to prevent carbonization, and the operator by watching my temperature indicating means is therefore enabled to prevent the temperature rising beyond these critical points and therefore he is enabled to absolutely prevent any charring or carbonization at all, and consequently, is enabled to produce first grades of rosin under all conditions. Further, it should be observed that I apply my process to all grades of the crude product regardless of its age. Under the old process differing variations were introduced according to the age of the product, and also according to the ideas of the different operators. By my process, however, one invariable rule is given to the operators with the certainty that efficient results are sure to follow.

In order that my process may be more fully understood, reference is had to the accompanying drawings forming a part of this specification, and in which:—

Figure 1 is a side view of a still and condenser attached thereto; Fig. 2 is a view, on a larger scale, showing the face plate of the thermometer; and, Fig. 3 is a cross section of a part of the still, showing the means for holding the thermometer.

*a* represents a still of any ordinary or approved form, to the top of which is connected one end of a condenser worm *b*, in a condenser *c*, all being of the ordinary type. The lower part of the condenser *c* is provided with an inlet pipe *d*, through which water is supplied by any suitable means; *e* is an overflow pipe connected to the top of the condenser *c* and communicating with the top of the still *a*. *f* is a valve in said pipe. The condenser *c* is supported as usual in brick work *h*.

*g* represents the face plate of a thermometer, the tube of which is bent at right angles, the horizontal part passing through the brick work and wall of the still, as described and shown in my former Patent No. 900,575, dated Oct. 6, 1908. As shown in Fig. 2, the face plate *g* is not only graduated as an ordinary Fahrenheit thermometer but also bears specific legends, all of use in my process. Thus besides the usual marks at every ten degrees, the point corresponding to the boiling point of water is marked "212" and also "Spirits" indicating to the operator the point when the water in the charge in the still (and incidentally the spirits of turpentine) begins to evaporate. Thus the 275 degree point is also marked and midway between this point and the 250 degree point is the word "Water" with arrows leading from this word to the 250 and 275 degree points, respectively. Then the 306 degree point is marked with the word "Fluidity" opposite it, and finally the 316 degree point is marked with the word "Limit" opposite it. I prefer to use a mercury thermometer, but could use any form of thermometer or pyrometer or indicating device which will indicate with reasonable accuracy the temperatures inside the still.

From a long series of experiments I have discovered that when the crude gum is raised in the still to a temperature of about 275° F. that the water which is intimately and possibly chemically combined with the product, has been distilled off, and that therefore, if the heating is continued without water, carbonization or discoloration begins to take place. As this water is given off it is a matter of necessity that more water should be added, as otherwise the temperature will rapidly run up, resulting inevitably in carbonization. After the process is conducted steadily with the addition of small quantities of water for a considerable time, during which the temperature is slowly allowed to rise until it reaches 306° F., practically all of the spirits of turpentine and other volatile products, including the water, are driven off, great care being taken that the limit of 316° F. should not be exceeded. As a matter of fact, under the old process whenever it was attempted to get out of the crude gum all of the turpentine contained therein, the rosin was invariably discolored and therefore its commercial value largely destroyed. According to my invention, however, these objections are all obviated, and in carrying out the same I preferably distil the crude gum up to say when 260° F. is reached, and then begin to add water slowly, and especially after the point of 275° F. has been reached. The water is added continuously and in small quantities after 275° F. has been reached and until 306° F. is attained. The temperature is thus prevented from rising too rapidly, and the gum is forced to give up all of its spirits without any undue carbonization. The time during which this water is added will vary according to the weight of the material being operated upon, but may roughly be stated in certain cases to extend over a period of a half an hour to an hour. After the temperature has reached 306° F. the distilling operation will have been practically completed as may be observed by the smallness of the quantity of spirits of turpentine which is being delivered from the worm of the condenser. At the end of the process it is desirable to make the residue in the still perfectly fluid, and therefore the temperature is permitted to reach up to say 316° F. whereupon the same may be withdrawn from the still and a new batch of material introduced. Should the temperature be permitted to rise much beyond 316° F. gas will be given off, and the residue thus decomposed.

The above process was discovered after a series of experiments which were satisfactorily continued for over a year, and which resulted in the disclosure of the fact that if the temperature is not allowed to rise above 260° F. only about one-third of the spirits will distil over. These experiments further resulted in discovering the fact that unless water is added after a temperature of 275° F. is reached all the turpentine and volatile products would not come off for the mass would settle down into a quiescent state without any ebullition, and would remain in such a state until the heat rose above the danger point of 316° F. after which gas would be given off. From these experiments I have thus been enabled to formulate a definite system of rules for the distillation of crude gum, and to indicate the proper points on the face plate of a thermometer to show the operator what must be done to carry out the process correctly.

According to my invention the temperature inside the still may at all times not only be accurately known by the operator, but may be regulated as well. That is to say, the operator may at all times observe the thermometer, and thereby know with accuracy the temperature of the contents of the still, whereupon when said temperature rises or falls to an undesirable degree, he then regulates the cock $f$ or other means, which controls the amount of water admitted to the still, and thereby brings the temperature back to the desired point, which is usually in the neighborhood of 306° F. Of course, in some instances, this regulation of temperature is aided by an increase or decrease in the amount of heat admitted to the still.

Those skilled in the art will be able to practise my invention from the above disclosure, but in order to make the process more clear, the following specific example is given:—Suppose one has in the still 10 barrels or 550 gallons of crude gum, and suppose the temperature has been observed to be about 260° inside the still, water will now be added at the rate of about one gallon per minute and the time this water is permitted to flow into the still will depend upon the amount of gum being treated. With the 10 barrels above supposed, water may be added for about an hour and fifteen minutes, during which time the temperature may be steadily increased at the rate of about six tenths (.6) of a degree per minute. Of course, the above supposes that distillation has been going on for about 45 minutes prior to the addition of water, and during which 45 minutes the temperature has steadily increased from 212° to 260°. I may cite as another specific case— 5 barrels of crude gum in the still, in which instance it would probably take 25 minutes to raise the temperature from 212° to 260° when water would be added at the rate of one gallon per minute for a period of about 35 to 40 minutes during which time the temperature will be steadily increased from 260° to 306°.

What I claim is:—

The process of distilling off turpentine from crude gum which consists in subjecting said gum to a temperature inside a still of substantially 260° F., then adding water continuously and permitting the temperature to rise to a point not exceeding 306° F. whereupon the addition of water is stopped, then allowing the temperature to rise to substantially 316° F. inside the still to soften the residue left in the still, and finally withdrawing said residue from the still, substantially as described.

In testimony whereof, I affix my signature, in presence of two witnesses.

STEPHENS NEAL.

Witnesses:
R. M. PARKER,
L. B. JONES.